United States Patent [19]

Pillai et al.

[11] Patent Number: 4,938,934
[45] Date of Patent: Jul. 3, 1990

[54] RECOVERY OF CESIUM CHLORIDE FROM POLLUCITE ORE

[75] Inventors: G. Chithambarathanu Pillai; Kenneth S. Pisarcyzk, both of Peru, Ill.

[73] Assignee: Carus Corporation, Peru, Ill.

[21] Appl. No.: 352,267

[22] Filed: May 16, 1989

[51] Int. Cl.$^5$ .......................... B01D 9/02; C01D 3/08
[52] U.S. Cl. .................................... 423/197; 23/296; 423/111; 423/138; 423/202; 423/208
[58] Field of Search ............... 423/499, 197, 202, 208, 423/111, 122, 131, 138, 140, 150; 23/296, 297, 298

[56] References Cited

U.S. PATENT DOCUMENTS

| | | | |
|---|---|---|---|
| 2,808,313 | 10/1957 | Fleischmann | 423/499 |
| 3,207,571 | 9/1965 | Berthold | 423/202 |
| 4,447,406 | 5/1984 | Mein | 423/179 |
| 4,466,950 | 8/1984 | Mein | 423/179 |

FOREIGN PATENT DOCUMENTS

| | | | |
|---|---|---|---|
| 2588847 | 4/1987 | France | 423/202 |
| 538988 | 1/1977 | U.S.S.R. | 423/208 |

Primary Examiner—Jeffrey E. Russel
Assistant Examiner—Brian M. Bolam
Attorney, Agent, or Firm—Tilton, Fallon, Lungmus & Chestnut

[57] ABSTRACT

A process for recovering purified cesium chloride from a cesium aluminum silicate ore in which the ore is digested with aqueous hydrochloric acid and the silica solids removed to obtain an aqueous acidic digest solution of metal chlorides consisting of cesium chloride together with other metal chlorides, by (a) evaporating water from the digest solution to obtain a solid mixture of metal chlorides, including cesium chloride and hydrated aluminum chloride;
(b) heating solid phase mixture at a temperature effective for converting the hydrated aluminum chloride to aluminum oxide without decomposing the cesium chloride;
(c) extracting the resulting solids with water to obtain an aqueous extract of cesium chloride; and
(d) separating the residual solids containing the aluminum oxide to produce a purified extract of cesium chloride.

11 Claims, No Drawings

RECOVERY OF CESIUM CHLORIDE FROM POLLUCITE ORE

FIELD OF INVENTION

This invention relates to the recovery of cesium from cesium-bearing mineral ores such as pollucite. More specifically, this invention relates to an improvement in a cesium recovery process wherein the cesium ore is digested with concentrated aqueous hydrochloric acid to obtain a solution containing cesium and aluminum chlorides.

BACKGROUND OF INVENTION

In the recovery of cesium from pollucite and other cesium-containing minerals it is known to digest the mineral ore with an aqueous solution of a strong mineral acid such as hydrochloric or sulfuric acids. When sulfuric acid is used, the cesium may be recovered as cesium alum. Processes for further purification of cesium starting with cesium alum are described in U.S. Pat. Nos. 4,469,670 and 4,466,950.

Alternatively, cesium ore may be roasted in admixture with an alkaline flux to convert the cesium to a water-soluble salt. For example, an alkaline reagent such as calcium oxide or carbonate may be used in combination with a chloride salt such as calcium or sodium chloride, as described in U.S. Pat. No. 4,597,955. The roasted ore then can be extracted with water to obtain an alkaline aqueous solution of cesium chloride together by filtration to obtain a clarified solution of the chlorides.

An important purification step in the process of the above-cited United States patents involves the addition of a water-soluble permanganate, such as potassium permanganate, to a clarified aqueous solution of the metal chlorides. The permanganate selectively precipitates cesium permanganate and other metal ions including aluminum, iron, sodium, potassium, and rubidium remain in solution. The separated cesium permanganate is substantially free of other alkali metal and polyvalent metal compounds. However, one disadvantage of this purification is that large amounts of potassium permanganate are required, a relatively expensive reagent for large-scale processing of cesium ore.

Also, other process steps are required, such as the addition of an alkaline reagent to raise the pH from the low pH of the digest solution, a higher pH being needed to maintain permanganate stability. On the upward adjustment of pH, hydroxide precipitates of aluminum and/or iron may form, and it is necessary to remove these before the solution of metal chlorides is treated with the permanganate. These processing steps are described in U.S. Pat. No. 4,447,406; which, in effect, provides the starting point for the development of the process of this invention. That patent and the other above-cited U.S. patents, as well as the present application, are owned by Carus Corporation of LaSalle, Ill.

SUMMARY OF INVENTION

This invention provides an improved process for recovering purified cesium chloride from a cesium aluminum silicate ore, such as pollucite. As in already known processes, the ore is digested with concentrated aqueous hydrochloric acid and the silica solids are removed to obtain an aqueous acidic solution of metal chlorides consisting principally of cesium chloride and aluminum chloride together with minor amounts of other metal chlorides. This digest solution may have a low pH, such as 1.0 or lower. With the process of this application, upward pH adjustment is not required and it is not necessary to remove the aluminum or iron as their hydroxides. Instead, water and HCl are evaporated from the digest solution to obtain a solid phase mixture containing all of the metal chlorides. Certain of the metal chlorides but not cesium chloride will be present in hydrated form in the solid phase mixture. Both the aluminum and the iron chloride will be present as hexahydrates.

In the next step of the process, the solid phase mixture of the metal chlorides is heated at the temperature necessary for converting hydrated aluminum chloride to aluminum oxide. This heating is carried out without decomposing the cesium chloride and may be carried out so as to convert hydrated ferric chloride to ferric oxide. The resulting aluminum oxide and ferric oxide (if present) are water-insoluble compounds, while the cesium chloride is highly water soluble. The cesium chloride can therefore be separated from the aluminum oxide (or aluminum and ferric oxides) by water extraction of the converted solids. By thereafter separating the insoluble residue, a purified extract solution of cesium chloride can be obtained.

The purified cesium chloride solution can be converted to a solid product by evaporation. Optionally, a staged evaporation procedure can be used, first removing a portion of the water to precipitate part of any sodium chlorides present in the ore, separating the precipitate, and thereafter completing the evaporation to produce the cesium chloride product in solid form.

Underlying the novel process of this invention is a chemical reaction which heretofore, as far as is known, has not received practical commercial application. Aluminum chloride hexahydrate on heating (fortuitously for the purpose of this invention) does not dehydrate, as occurs for hydrated metal compounds, but instead undergoes hydrolysis to form alumina ($Al_2O_3$). During the hydrolysis, HCl is evolved as a gas and water is formed. A similar reaction occurs with ferric chloride hexahydrate. On heating, this compound hydrolyzes and iron dehydrates to ferric oxide ($Fe_2O_3$) with the evolution of HCl and formation of $H_2O$.

DETAILED DESCRIPTION

The preferred starting material for the process of the invention is pollucite ore. However, other cesium-bearing minerals can be used although they are of lower cesium content, such as lepidolite and carnallite. These cesium ores as a class contain oxides of cesium and aluminum together with silica. The general formula for cesium ore such as pollucite is $Cs_2O \cdot Al_2O_3 \cdot 4SiO_2 \cdot nH_2O$. For example, a high grade pollucite ore, which is cesium aluminum silicate, may contain around 25% cesium oxide by weight. However, the content of cesium in crude pollucite ore varies over a considerable range. The cesium content of ground cesium ore can be upgraded by flotation to separate the pollucite from non-pollucite minerals.

Although the theoretical structure of pure pollucite is $Cs_2O \cdot Al_2O_2 \cdot 4SiO_2 \cdot nH_2O$, natural pollucite contains varying amounts of other alkali metals (sodium, potassium, and rubidium) which replace cesium in the pollucite crystal structure. Natural pollucite also usually contains some iron in the form of an iron oxide.

The cesium-bearing ore is crushed and ground to a state of fine subdivision. For example, the particle size may be −200 mesh (American Standard Screen). Particle size is not critical, but a fine state of subdivision is advantageous to facilitate rapid contacting of the hydrochloric acid with the cesium values to be solubilized.

The finely divided cesium-bearing starting material is subjected to a leaching-type digestion with aqueous hydrochloric acid (HCl). For example, a glass-lined reaction vessel equipped with an agitator can be used. The amount of HCl present will be generally somewhat in excess of the minimum amount required to react with the cesium and other metals to form soluble chlorides. For example, the HCl may be present in excess of the stoichiometric constant of from 15 to 75 percent. The concentration of the HCl may vary from 10 to 30 weight percent. A preferred concentration is from about 18 to 20 weight percent. In an optimized embodiment, 20% HCl is employed, which is an azeotropic mixture. This permits the reaction to be carried out under reflux at an elevated temperature providing optimum extraction. At the approximate 20% HCl concentration, under boiling conditions the distillate has the same concentration as the liquid (20% HCl) so that it can be evolved, condensed, and returned to the reaction mixture while the concentration in the reaction mixture remains the same. Although this procedure is desirable, it is not critical, and, as indicated, the reaction can be carried out at concentrations substantially above and below 20%. As a variation of the procedure described, if the starting concentration is below 20% HCl, the distillate will be largely water alone, and this can be permitted to evolve without condensation until the azeotropic concentration is reached, after which reflux can be applied to return a 20% distillate.

The extraction temperatures can be selected to promote the desired extraction. For example, an elevated temperature in the range of 100°-110° C. can be used. In the preferred embodiment, where 20% HCl is used under reflux, the reaction temperature at normal atmospheric pressure will be about 107°-108° C.

The extraction is continued until substantially all of the cesium has been solubilized as cesium chloride. This may require from 1 to 8 hours, depending on conditions. During extraction, the residual silicon dioxide ($SiO_2$) from the extracted pollucite forms insoluble hydrated silicon dioxide ($SiO_2 \cdot xH_2O$). Other insoluble substances may also be present. The extract is separated from these insolubles, preferably by a decanting operation, since the silicon dioxide hydrate is difficult to filter. Centrifugation is a less desirable method of separation.

The separated HCl digest solution contains the metal chlorides consisting principally of cesium chloride and aluminum chloride together with minor amounts of other metal chlorides such as particularly ferric chloride ($FeCl_3$) and alkali chlorides. Rubidium chloride may be the principal alkali metal chloride other than the cesium chloride. The pH of the digest solution will be very low, especially where excess HCl is used in the digestion, as preferred. For example, the pH may be around 1.0. The pH may be adjusted upwardly, but this is not required. Preferably, no pH adjustment is made since it is desirable to minimize the introduction of other metal compounds, such as sodium hydroxide.

According to the novel process sequence of the invention, water and most of the HCl are evaporated from the digest solution to obtain a solid phase mixture of the metal chlorides. The evaporation is carried out by heating the solution to a temperature above its boiling point. Usually, the solids will be heated to a temperature in excess of 200° C., such as from 250° to 600° C. As will subsequently be explained, the temperature may be selected so that upon formation of the solid phase mixture, continued heating will convert the hydrated aluminum chloride or both the aluminum chloride and the ferric chloride hydrates to water-soluble oxides.

As the solids are reduced to dryness, the aluminum chloride and the ferric chloride, if present, will be precipitated as hexahydrates, represented by $AlCl_3 \cdot 6H_2O$ and $FeCl_3 \cdot 6H_2O$. These hexahydrates on continued heating at the selected temperature are converted to oxides; namely, to aluminum oxide ($Al_2O_3$) and ferric oxide ($Fe_2O_3$). These reactions are represented by the following equations:

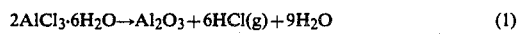
$$2AlCl_3 \cdot 6H_2O \rightarrow Al_2O_3 + 6HCl(g) + 9H_2O \qquad (1)$$

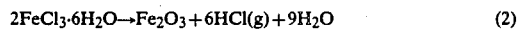
$$2FeCl_3 \cdot 6H_2O \rightarrow Fe_2O_3 + 6HCl(g) + 9H_2O \qquad (2)$$

As indicated, the HCl formed in the hydrolysis reactions will be evolved as a gas (g). Aluminum oxide and ferric oxide are substantially water-insoluble compounds. During the hydrolysis, the other alkali metal chlorides, which are in non-hydrated form, remain as chlorides. They are not decomposed or converted by the reaction. The heating is carried out at temperatures well below the melting point of cesium chloride (645° C.). Other polyvalent metal chlorides if present as hydrates may also be converted to insoluble oxides. This occurs to some extent with chromium.

The precipitation of the chlorides as a solid phase mixture by water and HCl evaporation and the subsequent heating of the solid phase mixture converts the hydrated polyvalent metal compounds to their insoluble oxides. This can be carried out as a continuous heating procedure. For this purpose, it is preferred to employ a temperature which is effective for converting the hydrated aluminum oxide, or both the aluminum chloride and ferric chloride hexahydrates to their oxides. In general, the temperature employed for the conversion reaction should be in the range from 250° to 600° C. A preferred heating range is from 275° to 450° C. On the basis of presently available data, it appears that the optimum temperature range is from about 300° to 400° C.

After the conversion reactions have been carried to completion, which can be usually accomplished in about 2 to 4 hours of heating, the solid product is cooled to a temperature below 100° C. and extracted with water to obtain an aqueous extract of cesium chloride. About 100 to 300 parts by volume of water may be employed per 100 parts by weight of the solids. The ratio of extracting water to solids is not critical but is a matter of convenience. Extraction usually will be carried out with agitation, and, if necessary, after subjecting the solids to subdivision, such as by grinding.

During the extraction, it is desired to solubilize substantially all of the cesium chloride. Other alkali metal chlorides will also be solubilized, while the aluminum oxide and ferric oxide, as well as other polyvalent metal oxides, if present, will remain substantially insoluble. The residual solids can be separated from the extract solution by any effective procedure, such as decantation, filtration, or centrifugation. Usually, filtration will be preferred. The resulting solution of cesium chloride will contain cesium in a highly purified form, and a high recovery of cesium can be obtained.

The purified extract of cesium chloride can be further processed. For example, a portion of the water may be removed by evaporation, precipitating part of the sodium chloride and possibly some of the other alkali metal chlorides, while maintaining the cesium chloride in solution. The partial removal of water may be carried out up to the saturation concentration of the cesium chloride to maximize the precipitation of the sodium chloride. If this sequential water removal procedure is used, the precipitated sodium chloride (or other metal chlorides) should be removed by filtration or centrifugation before completion of the dewatering. By evaporating the rest of the water, the cesium chloride is converted to a solid product. The purity at this point is sufficient for commercial use. However, if desired, further purification, by recrystallization or by precipitation as cesium permanganate, may be carried out.

This invention is further illustrated by the following examples.

EXAMPLE I 100 ml of a pollucite ore HCl digest liquor (122 g) was evaporated to dryness in a porcelain dish over a hot plate (temperature <500° C.). The resulting solids were ground and extracted with two batches of 250 ml water for 10 to 15 minutes, cooled, and filtered with ease. The filtrates were collected and evaporated over a hot plate. The resulting solid product contained around 90% cesium chloride along with alkali chlorides, but with only trace amounts of aluminum or other heavy metals. Cs recovery from the ore was 85 to 90%.

EXAMPLE II

The process of Example I was repeated with a larger weight of the HCl digest liquor, viz. 1220 g. The water extract, on concentration, gave some crystals rich in socium which were discarded, yielding CsCl of 91% purity with about 85% cesium recovery from ore. A complete analysis of the product is set out below in Table A.

TABLE A

| | (Analysis in ppm) | | |
|---|---|---|---|
| Element | Pollucite Ore | Pollucite Ore Acid Digested Liquor | CsCl from two preparations after removing NaCl solids |
| Li | 1600 | 1629 | 117 | 118 |
| Na | 12700 | 83150 | 23400 | 24800 |
| K | 300 | 5658 | 6250 | 5900 |
| Rb | 5800 | 27260 | 21900 | 21700 |
| Mg | 230 | 540 | 490 | 510 |
| Ca | 150 | 309 | 5000 | 6680 |
| Sr | <130 | 77 | 160 | 200 |
| Ba | <220 | — | <2 | <2 |
| Al | 96300 | 191200 | 2990 | 70 |
| Fe | 1300 | 2058 | 20 | 6 |
| Cr | 90 | 77 | 3 | 4 |
| Mn | 300 | 506 | 300 | 400 |
| Si | 21600 | — | <10 | <10 |
| Pb | — | — | — | — |
| CsRecovery % | | | 65.84 | 64.3 |
| Purity Cs % | 25.0 | 68.8 | 93.8 | 93.86 |

EXAMPLE III

The process of Examples I and II was repeated under controlled temperature conditions. 100 ml HCl digest liquor lots were evaporated to dryness at 150° C. and at 200° C. in an oven, and at 250°, 300°, 350°, and at 400° C. in a muffle furnace. The weight of the dry residue obtained was compared with those obtained at the hot plate temperatures (<500° C.) of Example I. The results are summarized in Table B.

TABLE B

| Temp °C. | Wt. Residue (g) | pH of Extract |
|---|---|---|
| Hot plate (<500° C.) | 20.4 | 5.9 |
| 150 | 32.5 | — |
| 200 | 22.6 | 4.1 |
| 250 | 21.3 | 4.5 |
| 300 | 20.35 | 5.3 |
| 350 | 20.2 | 6.0 |
| 400 | 19.8 | 5.9 |

In all the above experiments, the residue obtained was powdered and stirred with two batches of 250 ml water. The Cs recovered, which is comparable or better than a digestion procedure, indicated that a simple stirring is sufficient to solubilize and recover the cesium chloride in the extract.

The weight of 32.5 g obtained at 150° C. corresponds to the formation of $Al_2O_3 \cdot 3\, H_2O$. On adding water, it dissolved back into a white milky solution with a yellowish oily layer and was not filterable. At 200° C., the alumina obtained did not go back into solution but was difficult to filter, whereas those obtained at 250° C. and up are easily filterable as free flowing water. The filtrate obtained at 250° C. was reddish yellow in color, at 250° C., it was lighter in color, and at 300° C. and up, they wer colorless. These results indicate that even though at 200° and 250° C. most of the aluminum is precipitated as alumina, the polyvalent metals, like Fe and possibly Cr, were still in solution imparting color. Temperatures of 300° C. and above are apparently needed to remove the color imparting metal ions like Fe and possibly Cr. It appears temperatures greater than 300° C. are beneficial in obtaining a neutral extract. These results are summarized in Table C.

TABLE C

| Effect of temperature on heavy metal impurities (all in ppm) | | | | | |
|---|---|---|---|---|---|
| Temp °C. | Al | Mn | Cr | Fe | Cs Recovered |
| untreated | 216900 | 574 | 88 | 2334 | — |
| 200 | 30200 | 516 | 51 | 615 | 73* |
| 250 | 7800 | 500 | 17 | 450 | 94 |
| 300 | 530 | 470 | 5 | 25 | 79* |
| 300 | 520 | 520 | 6 | 22 | 95 |
| 350 | 180 | 419 | 42 | 12 | 91 |
| 400 | 200 | 324 | 70 | 6 | 88 |

*some solid spilled while evaporating and hence the lower yield.

I claim:

1. A process for recovering purified cesium chloride from a cesium aluminum silicate ore in which the ore is digested with aqueous hydrochloric acid and the silica solids removed to obtain an aqueous acidic digest solution of metal chlorides consisting principally of cesium chloride together with other metal chlorides, wherein the improvement comprises:
    (a) evaporating the water from said digest solution to obtain a solid phase mixture of metal chlorides, including cesium chloride and hydrated aluminum chloride;
    (b) heating said solid phase mixture at a temperature effective for converting the hydrated aluminum chloride to aluminum oxide without decomposing the cesium chloride;

(c) extracting the resulting solids with water to obtain an aqueous extract of cesium chloride; and (d) separating the residual solids containing the aluminum oxide to produce a purified extract of cesium chloride.

2. The process of claim 1 in which said ore is pollucite.

3. The process of claim 1 or claim 2 in which the metal chlorides in said digest solution include ferric chloride, said solid phase mixture includes hydrated ferric chloride, said heating is effective for converting the hydrated ferric chloride to ferric oxide, and the separated residual solids contain the ferric oxide.

4. The process of claim 1 or claim 2 in which said heating is at a temperature in the range from 200° to 600° C.

5. The process for recovering purified cesium chloride from pollucite ore in which the ore is digested with aqueous hydrochloric acid and the silica solids removed to obtain an aqueous acidic digest solution of metal chlorides consisting principally of cesium chloride and aluminum chloride together with other metal chlorides, wherein the improvement comprises:

(a) evaporating the water from said digest solution to obtain a solid phase mixture of metal chlorides, including cesium chloride and hydrated aluminum chloride;

(b) heating said solid phase mixture at a temperature in the range from 275° to 450° C. effective for converting the hydrated aluminum chloride to aluminum oxide without decomposing the cesium chloride;

(c) extracting the resulting solids with water to obtain an aqueous extract solution of cesium chloride; and (d) separating the residual solids containing the aluminum oxide to produce a purified extract solution of cesium chloride.

6. The process of claim 5 in which the metal chlorides in said digest solution include ferric chloride, said solid phase mixture includes hydrated ferric chloride, said heating is effective for converting the hydrated ferric chloride to ferric oxide, and the separated residual solids contain the ferric oxide.

7. The process of claim 5 or claim 6 in which said solid phase mixture is heated at a temperature of from about 300° to 400° C.

8. The process of claim 1 or claim 5 in which said other metal chlorides include sodium chloride as a principal component and said purified extract solution of cesium chloride includes sodium chloride, and the extract solution is further processed by evaporating a portion of the water until part of the sodium chloride precipitates while the cesium chloride remains in solution, and the precipitated sodium chloride is removed before the cesium chloride solution is converted to a solid product.

9. A process for recovering purified cesium chloride from pollucite ore in which the ore is digested with aqueous hydrochloric acid and the silica solids removed to obtain an aqueous acidic solution of metal chlorides consisting principally of cesium chloride and aluminum chloride together with ferric chloride and other metal chlorides, wherein the improvement comprises:

(a) evaporating the water from said digest solution to obtain a solid phase mixture including cesium chloride, hydrated aluminum chloride, hydrated ferric chloride, and other metal chlorides;

(b) heating said solid phase mixture at a temperature of from about 300° and 400° C. to convert the hydrated aluminum chloride and the hydrated ferric chloride respectively to aluminum oxide and ferric oxide without decomposing the cesium chloride;

(c) extracting the resulting solids with water to obtain an aqueous extract solution of cesium chloride; and (d) separating the residual solids containing the aluminum oxide and ferric oxide to produce a purified extract solution of cesium chloride.

10. The process of claim 9 in which said other metal chlorides include sodium chloride as a principal component and said purified extract solution of cesium chloride includes the sodium chloride, and the extract solution further processed by evaporating a portion of the water until part of the sodium chloride precipitates while the cesium chloride remains in solution, and the precipitated sodium chloride is removed before the cesium chloride solution is converted to a solid product.

11. The method of claims 1, 5, or 9 in which steps (a) and (b) are carried out by a continuous heating procedure.

* * * * *